United States Patent
Emmons et al.

(10) Patent No.: US 10,691,083 B2
(45) Date of Patent: Jun. 23, 2020

(54) THERMOSTAT SYSTEM FOR REMOTE READING, SETTING, AND CONTROL OF DEVICES

(71) Applicant: Ademco Inc., Golden Valley, MN (US)

(72) Inventors: David J. Emmons, Plymouth, MN (US); Ajay Pai, Maple Grove, MN (US); Soumitri Kolavennu, Blaine, MN (US)

(73) Assignee: Ademco Inc., Golden Valley, MN (US)

( * ) Notice: Subject to any disclaimer, the term of this patent is extended or adjusted under 35 U.S.C. 154(b) by 936 days.

(21) Appl. No.: 14/821,070

(22) Filed: Aug. 7, 2015

(65) Prior Publication Data

US 2016/0040903 A1 Feb. 11, 2016

Related U.S. Application Data

(60) Provisional application No. 62/038,782, filed on Aug. 18, 2014, provisional application No. 62/035,067, filed on Aug. 8, 2014.

(51) Int. Cl.
| | |
|---|---|
| *F24F 11/00* | (2018.01) |
| *G05B 15/02* | (2006.01) |
| *H04L 29/08* | (2006.01) |
| *H04W 4/38* | (2018.01) |
| *H04W 4/80* | (2018.01) |

(52) U.S. Cl.
CPC .......... *G05B 15/02* (2013.01); *H04L 67/1078* (2013.01); *H04W 4/38* (2018.02); *H04W 4/80* (2018.02)

(58) Field of Classification Search
CPC .......... H04W 4/38; H04W 4/80; G05B 15/02; H04L 67/1078
See application file for complete search history.

(56) References Cited

U.S. PATENT DOCUMENTS

| | | | |
|---|---|---|---|
| 8,019,328 B2 | 9/2011 | Lunsford et al. | |
| 9,035,568 B2 * | 5/2015 | Ganton | H05B 45/20 315/291 |

(Continued)

OTHER PUBLICATIONS

Fatih Peksenar ("Designing Smart Thermostats that Provide Wireless Connectivity", Renesas Electronics America Inc., Sep. 2013).*

(Continued)

*Primary Examiner* — Mushfique Siddique
(74) *Attorney, Agent, or Firm* — Shumaker & Sieffert, P.A.

(57) ABSTRACT

A system and approach for remote reading, setting and control of devices such as thermostats. A phone, such as a smartphone, a gateway and a cloud may be incorporated relative to interaction with the device or devices. The gateway may have a hub that has bluetooth communication capabilities with the device. The hub may be connected to a router that in turn is connected to a cloud in a wireless or wired manner. The phone may communicate with the cloud to achieve interaction with the device. The hub may also handle WiFi communications. The gateway may instead be a phone that contains an app which lets operate as a gateway for communications with the cloud. There may be one or more devices that are a part of one or more home area networks that are connected to a gateway via bluetooth and WiFi, and in turn connected to the cloud.

10 Claims, 9 Drawing Sheets

(56) References Cited

U.S. PATENT DOCUMENTS

| | | | |
|---|---|---|---|
| 9,111,221 B1* | 8/2015 | Kelly | G08B 13/19 |
| 9,528,861 B1* | 12/2016 | Haupt | G01D 7/00 |
| 9,554,061 B1* | 1/2017 | Proctor, Jr. | H04N 5/268 |
| 10,142,122 B1* | 11/2018 | Hill | H04L 12/2807 |
| 2009/0054050 A1* | 2/2009 | Almeda | H04M 1/72533 |
| | | | 455/419 |
| 2011/0015802 A1* | 1/2011 | Imes | G05D 23/1923 |
| | | | 700/300 |
| 2013/0086245 A1* | 4/2013 | Lu | H04L 12/2807 |
| | | | 709/223 |
| 2014/0081465 A1* | 3/2014 | Wang | G05B 15/02 |
| | | | 700/276 |
| 2014/0217186 A1* | 8/2014 | Kramer | G05D 23/1905 |
| | | | 236/1 C |
| 2014/0266669 A1* | 9/2014 | Fadell | G05B 19/042 |
| | | | 340/501 |
| 2014/0330569 A1* | 11/2014 | Kolavennu | G10L 21/16 |
| | | | 704/275 |
| 2015/0153317 A1 | 6/2015 | Krebs | |
| 2015/0338117 A1* | 11/2015 | Henneberger | G05B 15/02 |
| | | | 700/276 |
| 2016/0043827 A1* | 2/2016 | Filson | H04K 3/22 |
| | | | 370/252 |
| 2016/0044719 A1* | 2/2016 | Sidhu | H04W 76/10 |
| | | | 370/329 |
| 2016/0057550 A1 | 2/2016 | Shennib | |

OTHER PUBLICATIONS

IEEE Standards Association, "IEEE Standard for Information Technology—Telecommunications and Information Exchange Between Systems, Local and Metropolitan Area Networks—Specific Requirements. Part 11: Wireless LAN Medium Access Control (MAC) and Physical Layer (PHY) Specifications," IEEE Std. 802.11, 2793 pages (this eference will be uploaded in 14 parts), 2012 (Revision of IEEE Std. 802.11-2007).

* cited by examiner

THERMOSTAT SYSTEM FOR REMOTE READING, SETTING, AND CONTROL OF DEVICES

This application claims the benefit of U.S. Provisional Application No. 62/038,782, filed Aug. 18, 2014, and entitled "Bluetooth Thermostat and Hub". U.S. Provisional Application No. 62/038,782, filed Aug. 18, 2014, is hereby incorporated by reference.

This application also claims the benefit of U.S. Provisional Application No. 62/035,067, filed Aug. 8, 2014, and entitled "Bluetooth Thermostat and Hub". U.S. Provisional Application No. 62/035,067, filed Aug. 8, 2014, is hereby incorporated by reference.

BACKGROUND

The present disclosure pertains to thermostats and particularly to interacting with thermostats.

SUMMARY

The disclosure reveals a system and approach for remote reading, setting and control of devices such as thermostats. A phone, such as a smartphone, a gateway and a cloud may be incorporated relative to interaction with the device or devices. The gateway may have a hub that has bluetooth communication capabilities with the device. The hub may be connected to a router that in turn is connected to a cloud in a wireless or wired manner. The phone may communicate with the cloud to achieve interaction with the device. The hub may also handle WiFi communications. The gateway may instead be a phone that contains an app (application) which lets operate as a gateway for communications with the cloud. There may be one or more devices that are a part of one or more home area networks that are connected to a gateway via bluetooth and WiFi, and in turn connected to the cloud.

DESCRIPTION

Figure 1:
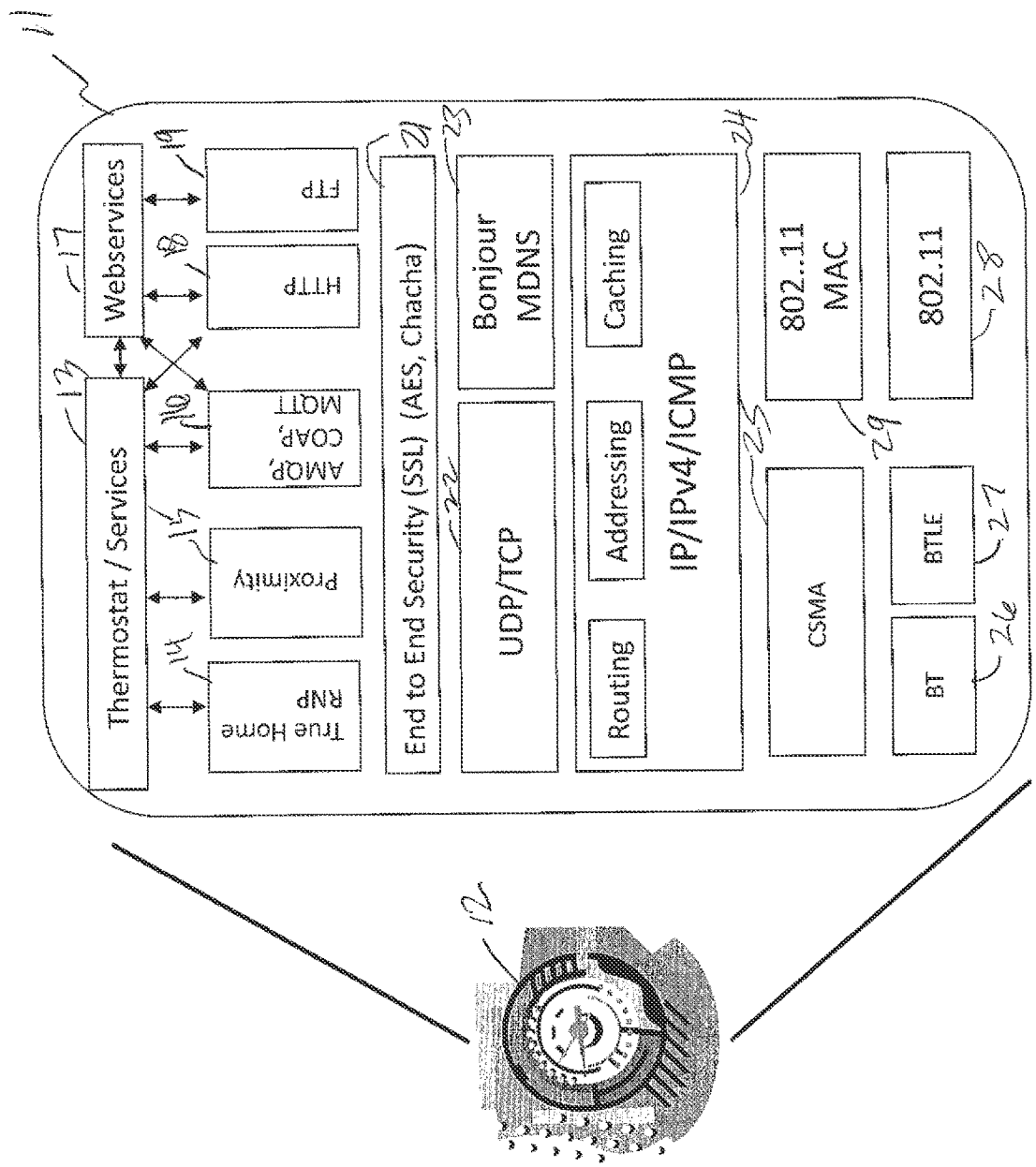
FIG. 1 is a diagram of a software stack for a thermostat.

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Residential and commercial thermostats may have varying control and powering requirements. In some cases, there may be just 2 wires for simple on-off control; in other cases, a thermostat may have just a wireless connection to an equipment interface module; in other cases, there may be several stages of heating, cooling, and other control points for indoor air quality, and so forth. A wire count may vary for 0-8 or more wires. Purely mechanical thermostats do not necessarily require any power to function. Modern thermostats may require power for switching control relays, microprocessors, displays, and in some case radio communication. Contractors may desire to have a thermostat that is universally capable of functioning in all/most situations to minimize their installation and training time/cost as well as to minimize the number of products they need to stock and carry on their trucks. Powering a modern thermostat (relays, microprocessor, display, radio, and so on) is a challenge because in about 50 percent of the cases there is not necessarily a common wire to provide 24 VAC to power the thermostat directly. There may be several options noted herein when a common wire is not present. The order of the following options does not necessarily imply that one option is better than another option. Further, there might be options not mentioned herein.

One option may be to pull a common wire. This may appear difficult and time consuming (or virtually impossible in many cases) due to finished walls and lack of accessibility.

Another option may be to repurpose a control wire, like a G-Fan wire. To act as a common wire, this may require rewiring of furnace fan control board and be beyond the skill level of most homeowners. Also, this may lead to a loss of independent fan control.

A third option may be to deploy a wire saver module. This may be difficult for a consumer and require extra time for a contractor.

Another option may be to use an advanced power stealing circuit. The circuit may sip power during control cycles and may also sip power at levels below fan control board relay actuation in the off cycle. This might not necessarily work for some systems, such as milli-volt control systems.

A fifth option, but not necessarily the only remaining option, may be a use of batteries. This may work universally, even when there are zero wires. Battery life may need to exceed one year and even be greater than two years. Battery life may limit the display, microprocessor and radio selection.

To be truly universal, a thermostat may need to be able to operate on batteries (zero wire compatible); preferably two AA batteries operating for at least one to two years. Ideally, this universal thermostat might be WiFi connectable, but WiFi connectivity with low communication latency may require a relatively large amount of power. The WiFi radio energy consumption plus the display, microprocessors, and control switching energy consumption may make it very difficult to get a long battery life (one to two years) with just two AA batteries.

Another series of issues to be addressed may incorporate the standardization and simplification of the installation, commissioning, checkout, ISU (installation setup) storage, and diagnostics of a thermostat. During the installation of a new thermostat, the installer should set the ISU's to the type of equipment that is being installed. If the thermostat is being replaced, it may be desirable to have previously stored the entire configuration setting so that it can be downloaded into the new thermostat. In cases where the contractor doesn't have access to the WiFi network or where there is no WiFi network available, it is not necessarily possible to store the settings on the homeowners connected home account. For new equipment installations, it may be time consuming to move about the house (back and forth from thermostat to equipment) when the system is being checked-out. Furthermore, an automated checkout program that runs the systems through its paces may be initiated while the contractor is doing something else (like packing tools back into the truck, and so forth). If the system has an issue in the future, it may be helpful if the contractor could connect to the thermostat directly and get the diagnostics logs such as the user interaction log, fault logs, temperature logs, run times, relay status, and so on.

A thermostat with a Bluetooth or Bluetooth low energy (BLE) radio and simple pairing process may solve many issues. Because of the significantly low power needs of the BLE radio versus WiFi, a thermostat may operate for one to two years on two AA batteries. Because of the significantly lower power and cost of the BLE radio, the thermostat may be both universal in fit (work with 0-N wires) and be included in lower cost thermostats in a full line portfolio. The thermostat control may be peer to peer through BLE and be extended through a smart phone or tablet by passing the BLE communications to the web through the connected device. The contractor may save the initial set-up variables in its account for future reference if the homeowners have issues. When the contractor returns to the home to trouble shoot an issue, it may pair to the thermostat locally through BLE and download the user interaction logs along with the temperature and humidity logs. If the contractor finds that the homeowners have changed the ISU settings, the contractor may simply pull ISU settings from his account and download them to the thermostat. After a new thermostat/equipment installation, the contractor may put the thermostat in a check out mode where the app runs the thermostat/equipment through a series of tests to check it out.

A BLE radio on a thermostat may also be used for low power local pairing while the thermostats ISU's are being configured, and the SSID and password are being entered. Having an in home connected experience through BLE may give the homeowner an opportunity to create a connected thermostat account and begin to experience the concept of remotely controlling the thermostat with a universally fitting and relatively low cost thermostat (acting as a local connected trial experience). Temporary connection to the web may be achieved through a paired "AND" WiFi/Cell connected device. During this temporary connection, the thermostat may pass its data logs and status to the cloud and/or get new firmware/other downloads from the web.

A thermostat with BLE radio may have the following advantages. The order of the following options does not necessarily imply that one advantage is better than another advantage. Further, there might be advantages not mentioned herein. One may be a universal fit connected thermostat (0-8+ wires) with low latency and long battery life (one to two years) with two AA batteries.

Another is an automated set-up (ISU's . . . ). Contractors may pick from a series of standard profiles and then download them through BLE to the thermostat. A third may be to replicate settings during an upgrade. By pairing with a thermostat, a contractor may extract ISU's and other user preferences before upgrading a thermostat and downloading the old settings.

A fourth may be a simplified low cost user interface on a thermostat. During set-up, a low power BLE connection may be used to enter information such as an SSID and a password setback schedule, and so on.

Local remote control by a contractor may be another advantage. During setup and checkout of new equipment or diagnosis of failed equipment, it may be desirable to have local remote control to be able to cycle the equipment without having to return to the thermostat. This may be useful especially if the equipment is difficult to access such as in an attic, crawl space, or roof mounted equipment.

Local remote control by a homeowner may also be an advantage. A DIY (do it yourself) consumer may remotely control its thermostat from its smart phone or tablet and experience virtually all of the benefits that the contractor does as noted herein. Additionally, the locally connected thermostat and registration may allow for saving of the thermostat settings, upgrading of the thermostat firmware, local control such as when in bed or remote from the primary thermostat location. Additionally complex interactions like creating setback schedules or reviewing interaction logs or advanced energy analytics may be done on the smart phone or tablet.

A seventh advantage may involve automated checkout/diagnostics. After a new equipment installation or major upgrade/repair, it may be desirable to run the equipment and control through a checkout process to be sure that it is correctly configured and to avoid a costly call back. If the thermostat is paired locally to the contractors, the smart phone or tablet checkout program may be run that would automate a series of tests to verify the various stages of heating, cooling, indoor air quality equipment, snd so forth. A temporary discharge and return air sensor may be used to fully characterize the system and store the data in the contractor's account for future reference/diagnostics.

An advantage may be use of a smart phone or tablet as a selling tool. During installation of a new furnace of thermostat, the contractor may use a local BLE connection to demonstrate the utility of a connected stat as well as show a homeowner different thermostat and accessory options. An app may be written that completely emulates the visual interface of a line of thermostats and the contractor may take the homeowner through a process showing the cost and benefits to more advanced thermostat options and then demonstrate the user interface on his tablet/smart phone.

A ninth advantage may incorporate an upgrade to anywhere control with a hub. A BLE/WiFi hub may be paired with a thermostat and create a control from an anywhere connection. The hub may be a smart phone, tablet or dedicated multi-radio hub.

Another advantage may be having a plug in multi radio BLE hub. A multi radio hub may be in the form of a plug in transformer and be powered via a wall outlet within BLE range of the thermostat. The hub may create persistence, low latency internet connection via WiFi through a homeowner's router. To prevent accidental removal, the hub may be screwed to the outlet with a tamper resistant screw or cover plate that could be placed over the screw. The hub may be further enhanced by making the outlets pass through the hub and by locating all of the electronics and antennas outside the perimeter of the outlet (in a wide and tall but thin form surrounding the outlet face plate).

An eleventh advantage may be a secure pairing through dual button push. An approach of secure pairing may require a timed button push on the smart phone/tablet and the device being paired.

A very simple and low cost thermostat may include a BLE radio and a smart phone app. The thermostat may have a minimal display of temperature, set point, mode (heat, cool, off) and fan control. Up/down buttons may be used to control a set point and the secure pairing process. Once paired, the basic thermostat functionality may be emulated on the smart phone/tablet app and additional features may be enabled, such as by creating setback schedules, system set-up, energy usage, or system diagnostics, and so on. When a homeowner creates an online account, the thermostat ISU settings along with the equipment type and configuration may be passed to an account in a cloud. As the owner uses the local connection, stored data on the thermostat may be passed to a smart device for later uploading to a user account in the cloud. If the thermostat needed a firmware upgrade, the homeowner might receive a request and then the firmware may be downloaded the homeowner's smart device for later uploading to the thermostat. The local remote control may act as a trial platform for anywhere remote control which could be enabled by a BLE/WiFi hub.

For a contractor, a simple and standardized approach for local pairing may allow the contractor to connect to a thermostat and remotely control it from in a around the home during equipment installation, thermostat up-sell, system set-up and system check-out. Additionally, control, equipment settings, and performance data may be saved to the contractor's account for future reference. During a repair call, the contractor may pair to the thermostat and look at stored user interactions, temperature, and relay logs as well as test the system with the remote control (e.g., stand at the outdoor condenser and cycle the AC).

Items that may be noted incorporate a software stack, product configurations, device Commissioning using Bluetooth thermostat low energy (BTLE) and device interaction using BTLE. The device interaction may involve manipulating thermostat temperature, settings and programs, uploading and downloading thermostat installer settings, firmware downloading using a thermostat, and a diagnostics dump using a thermostat.

There may be an arbitration process when multiple devices attempt to communicate with a thermostat using a mobile device as a gateway to facilitate remote connectivity, device communication and control paradigm using a BT/WiFi hub, and optimizing battery power and discovery time using fast and slow advertisements based on user presence.

FIG. 1 is a diagram of a software stack 11 for a thermostat 12. Thermostat and services 13 may interact with true home RNP 14, proximity 15, and AMQP, COAP and MQTT 16. Thermostat and services 13 may further interact with web services 17 and HTTP 18. Web services may interact with FTP 19 and HTTP 18.

There may be end to end security (SSL) 21 such as AES and Chacha. Stack 11 may incorporate UDP/TCP 22 and Bonjour MDNS 23. There may also be routing, addressing and caching of IP/IP r/ICMP 24. Software stack 11 may also incorporate CSMA 25, BT 26, BTLE 27, IEEE standards 802.11 28 and 802.11 MAC (media access control address) 29.

Figure 2:
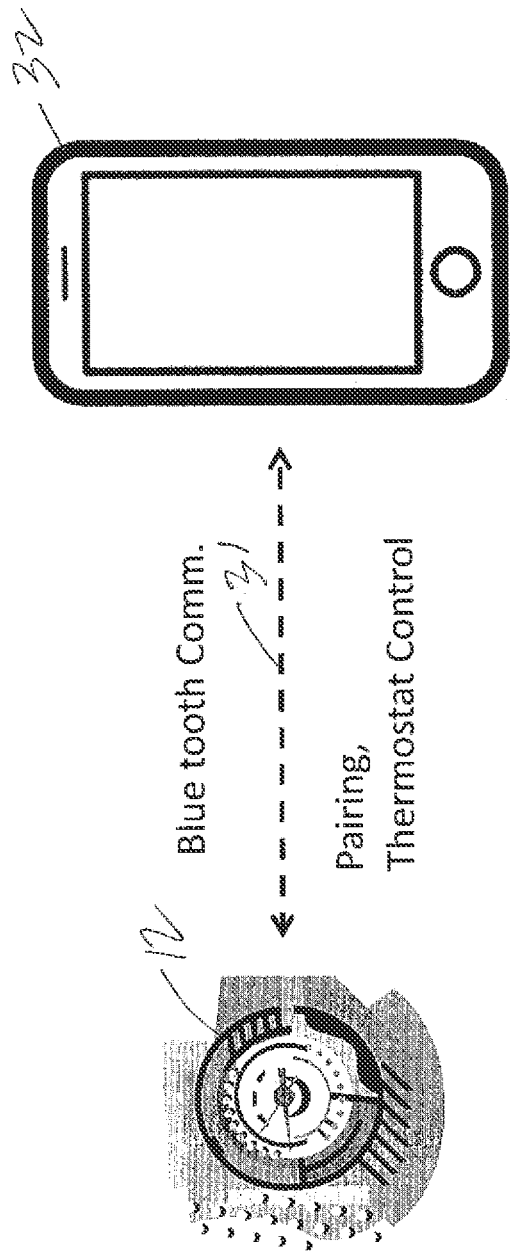
FIG. 2 is a diagram of a thermostat with proximity and peer to peer communication over bluetooth with an app of a smart phone, that may involve pairing and thermostat control.

FIG. 2 is a diagram of thermostat 12 with proximity and peer to peer communication over Bluetooth 31 with an app of a smart phone 32, that may involve pairing and thermostat control.

Figure 3:
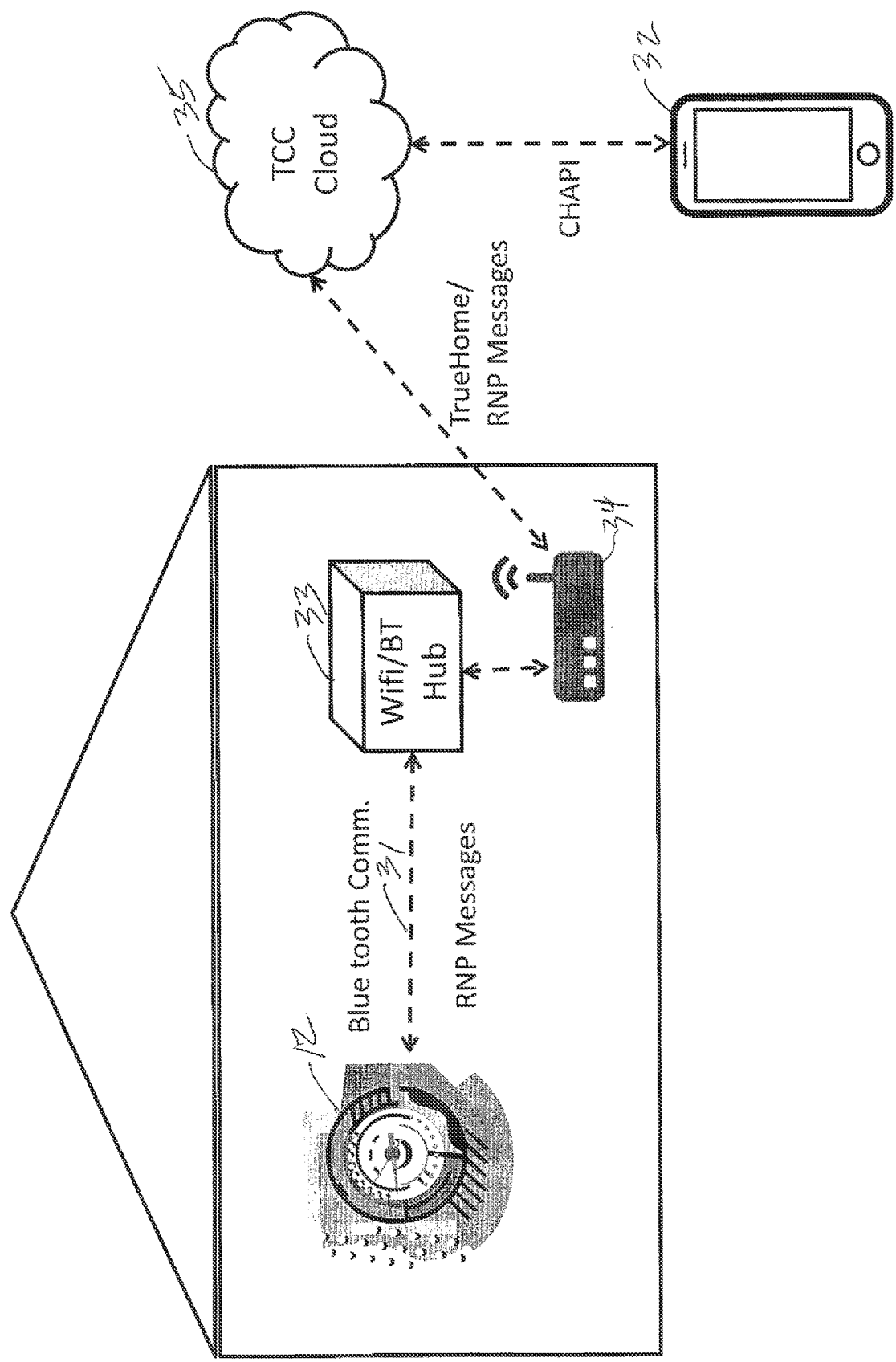
FIG. 3 is a diagram of a hub that may provide a gateway to a cloud for remote access and data warehousing.

FIG. 3 is a diagram of a WiFi/BT hub 33 that may provide a gateway 34 to a TTC cloud 35 for remote access and data warehousing. There may be Bluetooth 31 communication between thermostat 12 and hub 33, RNP messages may be sent along the Bluetooth 31 communication. True home RNP messages may be sent between cloud 35 Remote communication CHAP1 may be achieved between smart phone 32, cloud 35, gateway 34, hub 33 and thermostat 12.

Figure 4:
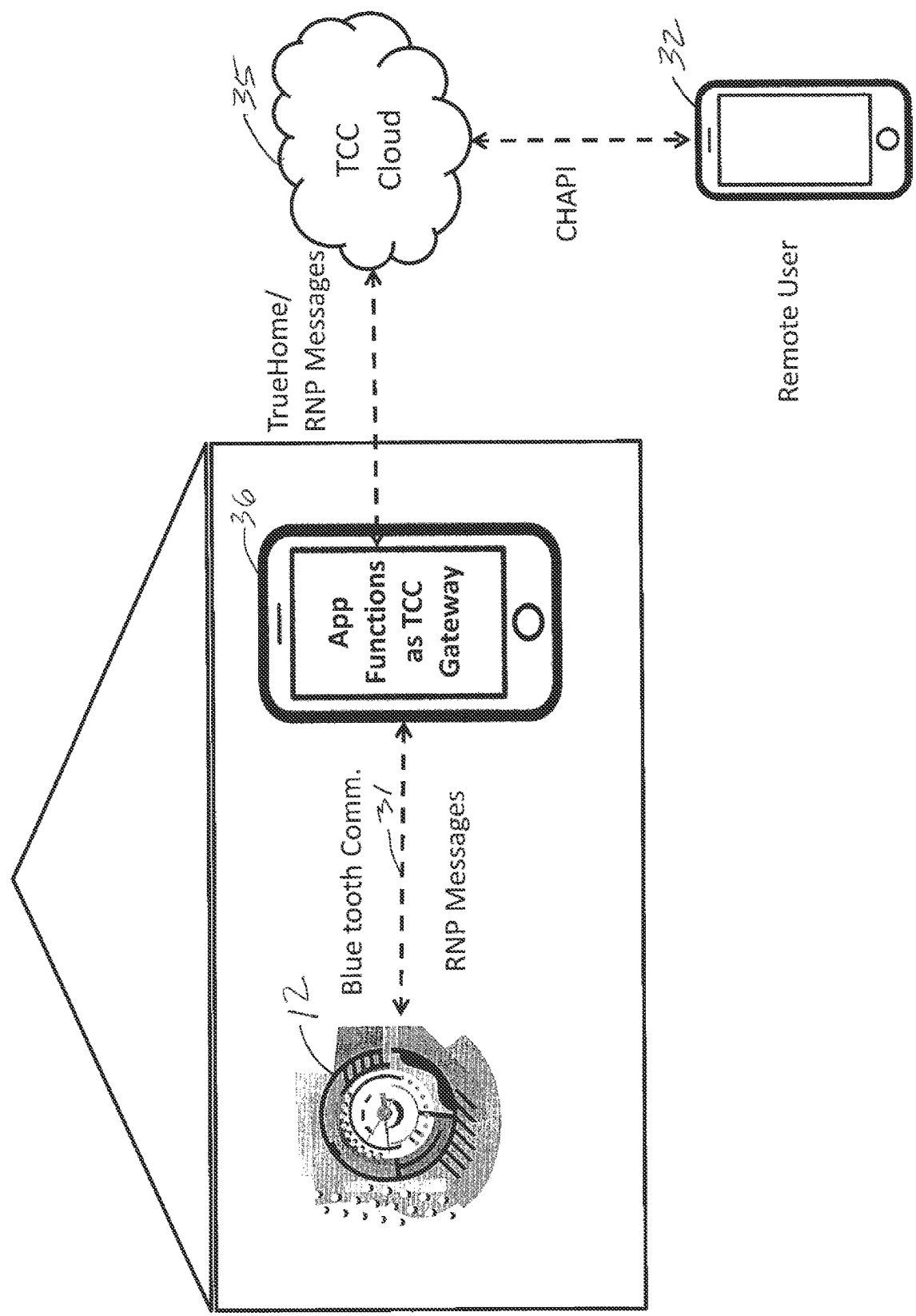
FIG. 4 is a diagram like that of FIG. 3 except that an app in a smart phone may operate as a gateway between a thermostat and a cloud.

FIG. 4 is a diagram like that of FIG. 3 except that an app in a smart phone 36 may operate as a TCC gateway between thermostat 12 and cloud 35. The app of phone 36 may route messages from the BT thermostat 12 to the TCC cloud 35. The app of hone 36 may also cache the messages.

Figure 5:
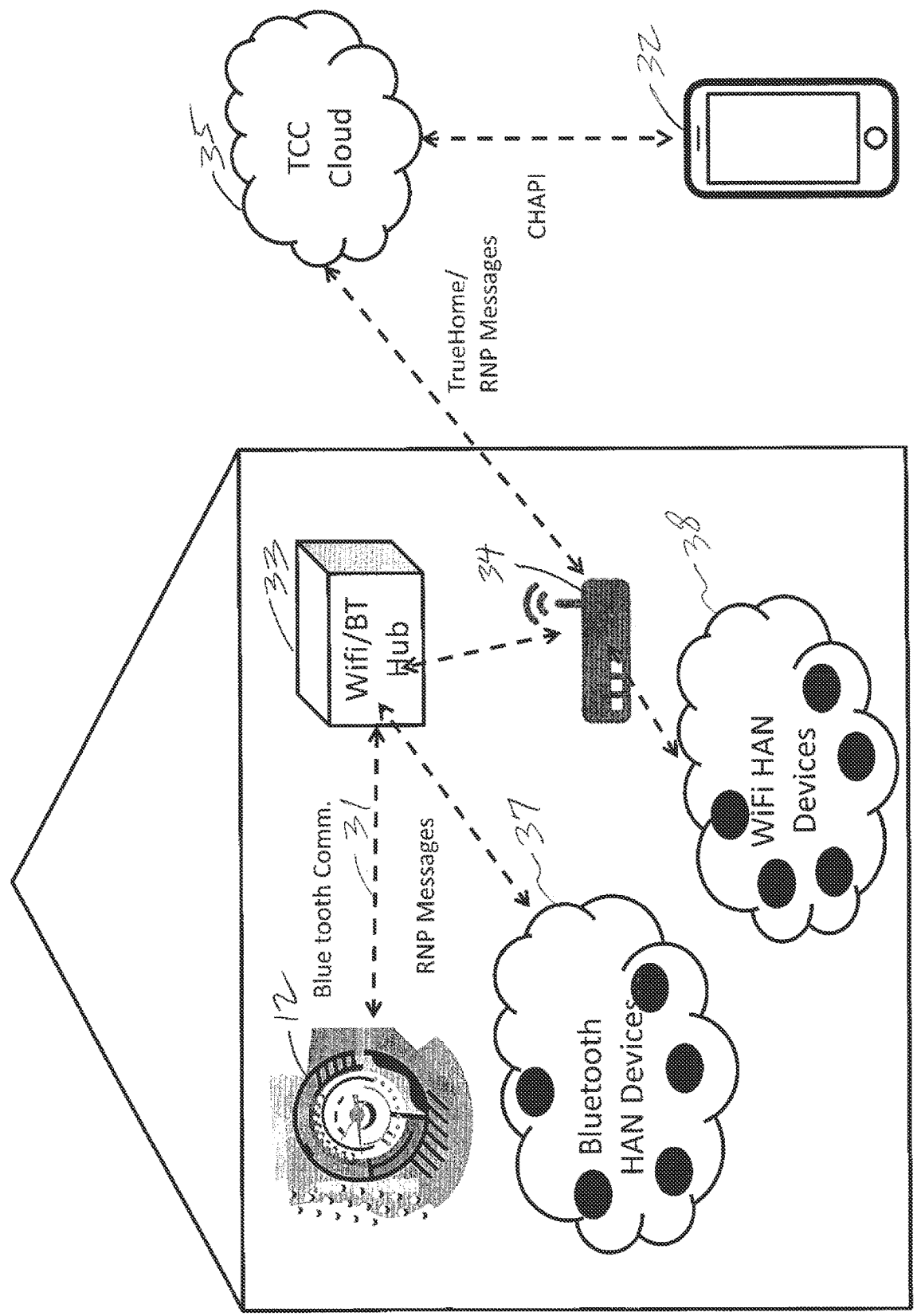
FIG. 5 is a diagram of a hub as a gateway to bluetooth home area network devices and WiFi home network devices.

FIG. 5 is a diagram of a WiFi/BT hub 33 as a gateway 34 to Bluetooth HAN (home area network) devices 37 and WiFi HAN devices 38 (with no meshing).

Figure 6:
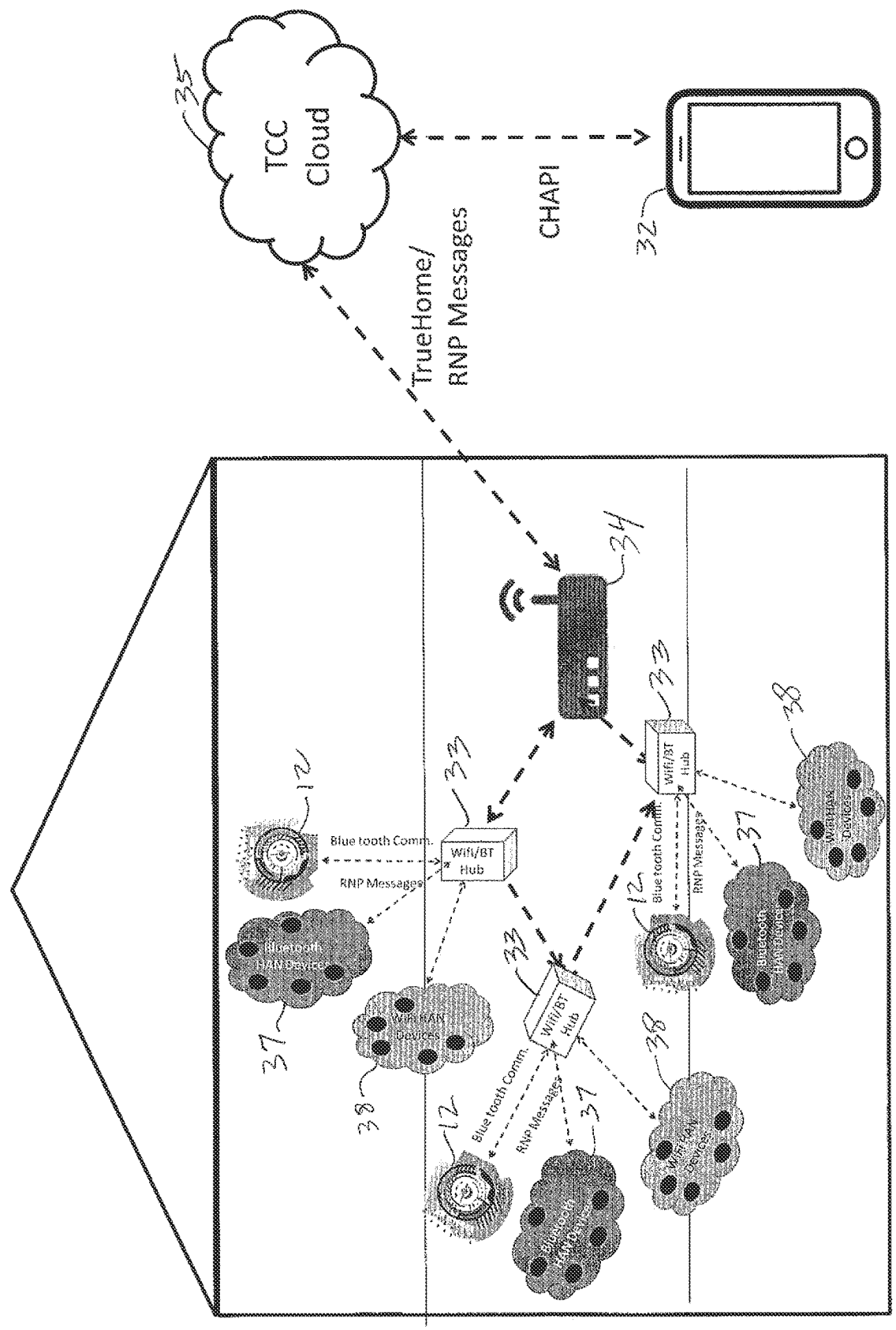
FIG. 6 is a diagram of a system having multiple hubs and networks for bluetooth and WiFi for coverage in large buildings.

FIG. 6 is a diagram of a system having multiple hubs 33 and networks for bluetooth and WiFi with mesh for coverage in buildings such as a large home.

Device commissioning with BTLE may be noted. A smart phone may be paired with a BTLE thermostat in the vicinity with QR codes, NFC, push buttons, pass code entry, and so forth. A handshake between the smart phone and the thermostat may be done to confirm pairing and communication. A series of questions may be asked on an app of the smart phone for ISUs. An ISU may be confirmed. A query may be made and a transfer of MAC ID/CRC (cyclic redundancy check) may be made from the thermostat. The app may be used to register the thermostat at a cloud. The present procedure may save battery power over WiFi thermostats since communication and access point functionality can be a major energy drain for WiFi. The procedure may also help in designing minimal user interfaces on an actual thermostat.

Figure 7:
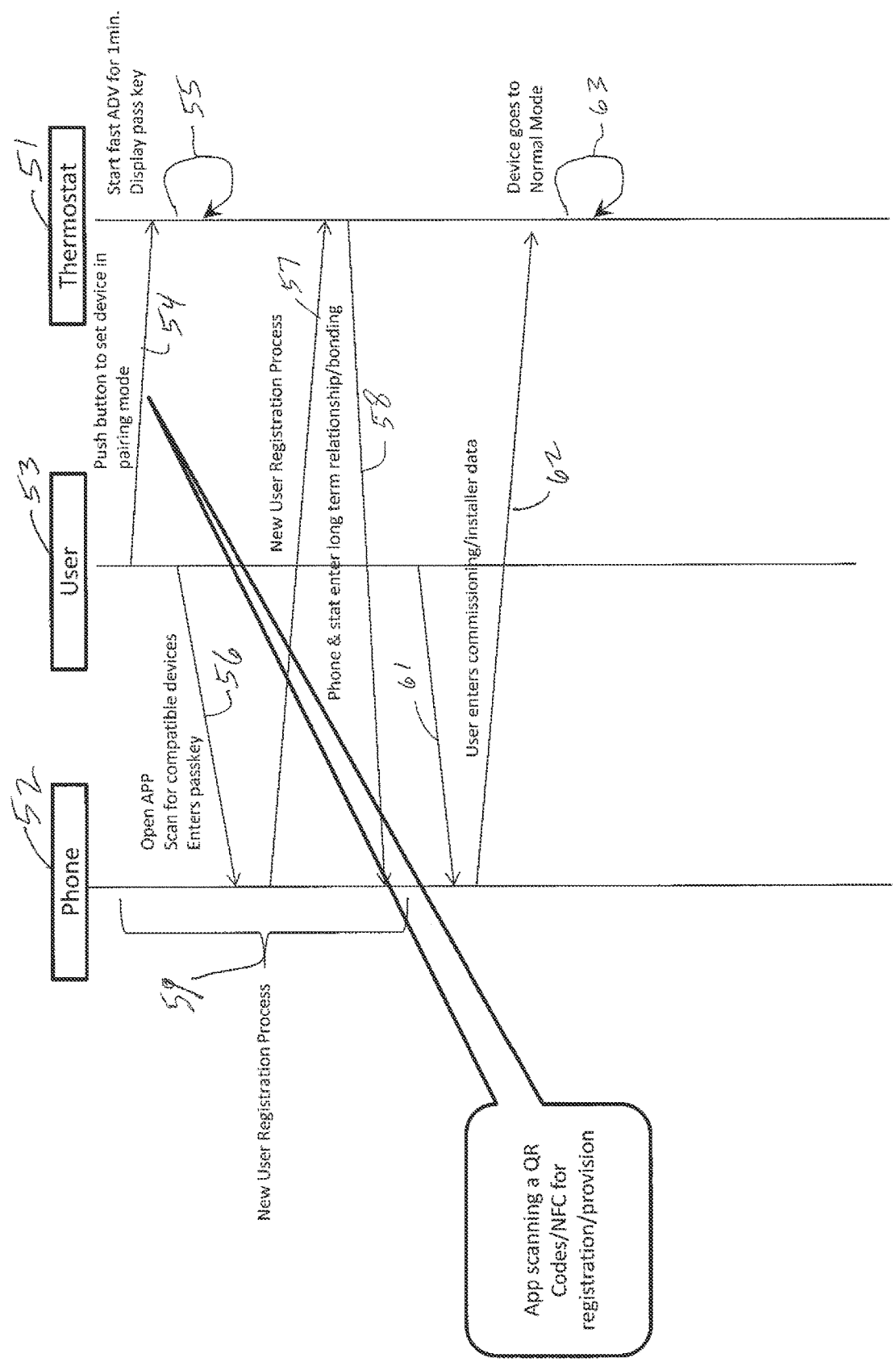
FIG. 7 is a diagram of a pairing procedure of a device, such as a thermostat, and a smart phone.

FIG. 7 is a diagram of a pairing procedure 59 (i.e. 54-58) and 61-62 of a BLE, device, such as a thermostat 51, and a smart phone 52. A user 53 may push a button on device 51 to set it in a pairing mode at line 54. An ADV (advertisement) may be started fast for about one minute at line 55 and 63, and then a pass key can be displayed. A user may open an app, scan for compatible devices, and enter the pass key in hone 52 at line 56.

Figure 8:
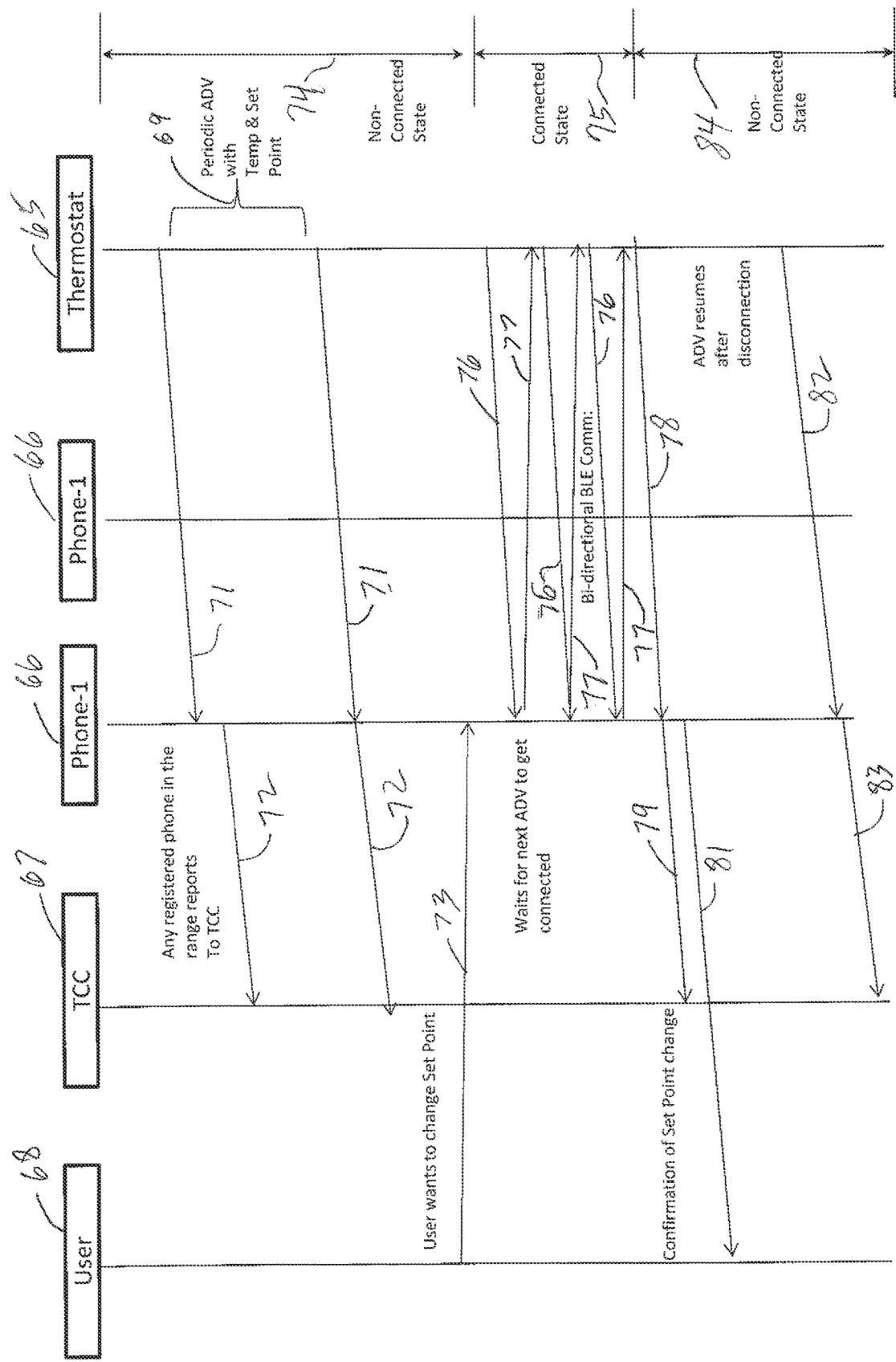
FIG. 8 is a diagram showing an operation of a device involving advertisement and set point change.

FIG. 8 is a diagram showing an operation of a device. At a thermostat 65, there may be a periodic ADV with a temperature and set point at bracket 69. A line 71 from thermostat 65 to phone 66 and from phone 66 to TCC (cloud) 67 may indicate that any registered phone, such as phone 66, registered in a range may report to TCC 67. At line 73, a user 68 may want to change asset point. The preceding items 69 and 71-73 may be regarded as a non-connected state 74. There may be a wait for a next ADV to get connected. In a connected state 75, there may be a bi-directional BLE communication between thermostat 65 and phone 66 as indicated by lines 76 and 77. Phone 66 may receive a communication along line 78 from thermostat 65. An indication from phone 66 to TCC 67 of confirmation of a set point change may proceed along a line 79. Phone 66 may provide a signal to user 68 along line 81. An ADV may resume after a disconnection from thermostat 65 to phone 66 and to TCC 67. A return of a non-connected state 84 may occur during lines 81-83.

Device commissioning via BTLE may be effected. The smart phone may be priced with a BTLE thermostat in the vicinity of the phone. The procedure of pairing may involve QR (quick response) codes, NFC (near field communication), one or more push buttons and/or a pass code entry. The phone may do a handshake with the thermostat to confirm pairing and communication. A series of questions may be asked on the app for ISUs. An ISU may be confirmed. A MAC ID/CRC may be queried and transferred from the thermostat. An app in the phone may be used to register the thermostat at a cloud. The procedure may save battery power over WiFi thermostats since communication and access point functionality can be a major energy drain for WiFi. The procedure may also help with designing minimal user interfaces on an actual thermostat.

Device interaction may involve manipulating thermostat temperature, settings and programs. One option may incorporate continuous advertisement. The thermostat may continuously broadcast an advertisement. Any paired smart phone that needs to control the thermostat may connect, change a state, get confirmation, and disconnect. Thus, the thermostat may be open for control to any paired smart phone in a vicinity of the thermostat.

Another option for device interaction may be a continuous connection of a phone that is based on a ranked prioritized list. Once the phone leaves a vicinity loses connection with a thermostat, another phone on the prioritized list may be connected. Generally, just a phone that is connected can control the thermostat. However, in some cases, the thermostat may broadcast advertisements to enable other phones in the vicinity to join and even control in a presence of a phone listed highest on the prioritized list.

Firmware may be downloaded to a thermostat using BT through an app of a smart phone. The thermostat may have a classic BT as well as a BTLE connection. The classic BT connection may be activated for a firmware download. An activation may be initiated through the BTLE connection. The firmware may be transferred using classic BT, after which the classic BT connection can be terminated. In other approaches, firmware downloaded to a phone may be transferred to a thermostat using BTLE via fragmentation and reassembly.

A diagnostic dump may be effected with a thermostat. The thermostat may collect information about its state and history. The information may be used for diagnostics, troubleshooting and analytics. The smart phone may be able to download the information whenever necessary or on a schedule. A download mechanism may be either over classic BT or over BLE with fragmentation and reassembly.

An arbitration process may be used when multiple devices attempt to communicate with a thermostat as noted herein. In one option, there may be continuous advertisement. No arbitration appears necessary here. Smart phones may be serviced in a first come (i.e., a first connect) on a first service basis.

In another option, there may be a primary smart phone in a vicinity of a thermostat that has prime access. Secondary phones may connect upon infrequent advertisements from the thermostat. If the primary smart phone is acting as a gateway, then secondary smart phones may access the thermostat through the cloud.

A mobile device may be used as a gateway to facilitate remote connectivity. The device as a gateway may operate for transport of status and control messages from a cloud to a thermostat. Operability of a gateway may be embedded in an app of a phone. The gateway in the phone may get information from a thermostat on a periodic basis and upload the information to a cloud. In addition, the gateway in the phone may check for control messages at the cloud and convey the messages to the thermostat. Higher latencies can be tolerated since remote control may use the feature with the cloud, whereas local control may be direct. In some thermostats, virtually all smart phone interaction may be through the cloud and thus frequent to the cloud might be necessary for good user experience.

There may be options relative to a mobile phone as a gateway for a thermostat. One option may be where RNP messages can be mapped to BT GATT (generic attribute profile) services and/or profiles. The thermostat may have a custom GATT server and a smart phone may have a BT GATT client. The phone may talk to the thermostat over BT GATT profiles. Another option may be where RNP messages are tunneled over BT.

Figure 9:
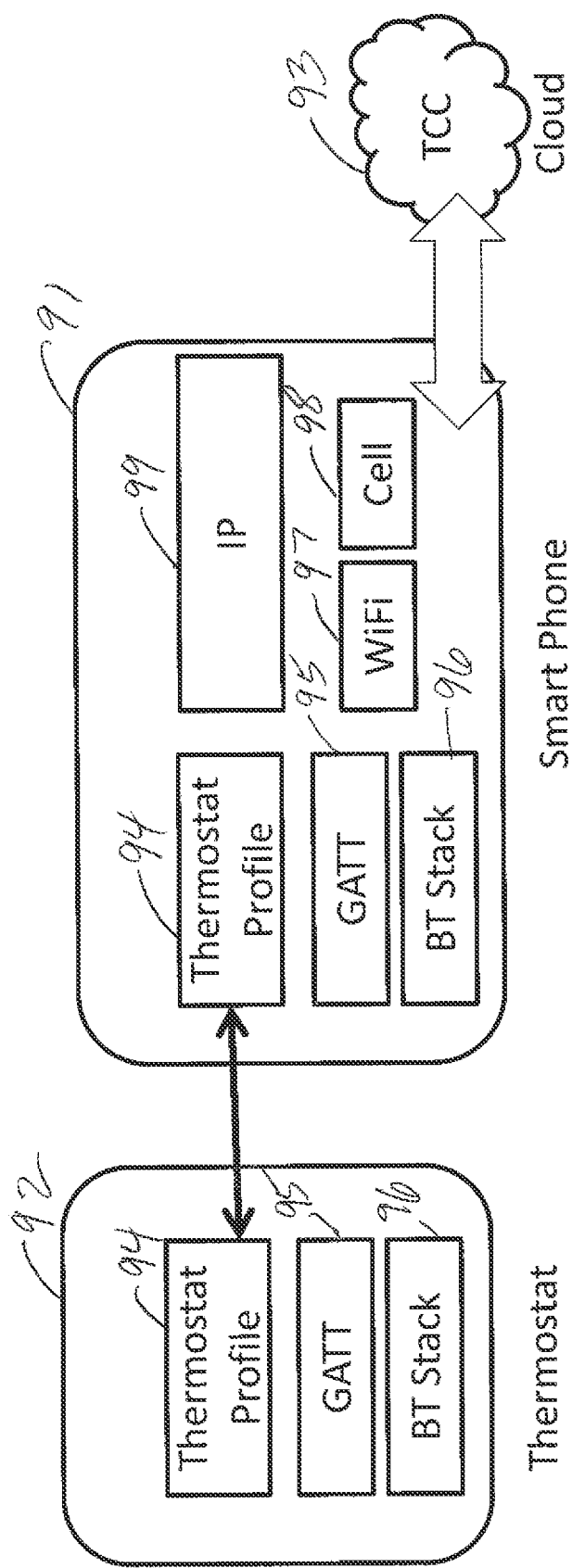
FIG. 9 is another diagram showing a mobile phone as a gateway for a thermostat relative to a cloud.

FIG. 9 is a diagram showing a mobile phone 91 as a gateway for a thermostat 92 relative to a cloud 93. A thermostat profile 94 in phone 91 may match a thermostat profile 94 in thermostat 92 as portrayed by a bi-directional connection between the profiles 94 in phone 91 and thermostat 92. Phone 91 and thermostat 92 may each incorporate GATT component 95 and BT stack 96. Phone 91 may further incorporate a WiFi 97, cell 98 and IP 99.

A device communication/control paradigm may use a BT/WiFi hub. A separate WiFi/BT device may operate as a gateway for transport of status and control messages from a cloud to a thermostat. The hub may be line powered and provide a continuous connection to the cloud. The hub may be embedded in the thermostat (e.g., the BTLE+WiFi thermostat). The hub may be a gateway to other BT and WiFi devices. The gateway may obtain information from the thermostat on a continuous basis and upload the information to the cloud. Additionally, the gateway may check for any control messages at the cloud and convey the messages to the thermostat. Higher latencies may be tolerated since remote control can use the feature, whereas local control may be direct. In some thermostats, virtually all smart phones may be through the cloud and thus frequent checks might be necessary of a good user experience.

Power save modes and device response time may be noted. Most of the battery energy may be spent on sending ADV at three channels. Longer DDV time may help increase battery life. However, longer ADV time may increase device discovery and connection time. For optimization, there may be advertisement modes that encompass fast advertisement and slow advertisement. External events may trigger the thermostat to switch between fast advertisements and slow advertisements. A schedule may be based on a resident's preference. A geo location of a phone may trigger a fast advertisement.

Multi-user registration and interactions may be noted. Multiple phones (of users) may be registered with a thermostat via a pairing procedure noted herein. Any of the registered phones may update thermostat data to the cloud (TCC) based on a received ADV. Any of the registered phones may connect to the thermostat to change parameters (e.g., get/set).

An administrative user may have more privileges to control a thermostat. For instance, the administrative user may revoke registered users and do firmware downloads and installer updates.

To recap, a thermostat system may incorporate a thermostat having bluetooth capability; a hub having a bluetooth connection with the thermostat, and having WiFi capability; a router having a WiFi connection with the hub and a cloud for transactions on cloud computing; and a smart phone or tablet having a WiFi connection with the cloud. The smart phone or tablet may have transmission and reception of signals to and from the thermostat.

The smart phone and the thermostat within a certain proximity of each other may have peer to peer communication over bluetooth.

The hub may provide a gateway to the cloud for remote access and data warehousing. The hub may further be a gateway to one or more additional bluetooth devices. The one or more additional bluetooth devices may be connected to a first home area network. The one or more WiFi devices may be connected to a second home area network.

The system may further incorporate one or more additional hubs. Each of the one or more additional hubs may have a bluetooth connection to a thermostat.

The system may further incorporate one or more devices having a bluetooth connection to the each of the one or more additional hubs.

The system may further incorporate one or more devices having a WiFi connection to each of the one or more additional hubs.

The hub may be line powered. The hub may provide a continuous connection of the thermostat to the cloud. The hub may be a gateway for one or more additional bluetooth and WiFi devices.

One or more additional smartphones may be connected to the thermostat via the cloud, the router and the hub. The one or more additional smart phones may be registered with the thermostat via a pairing procedure.

A registered smartphone may update data about the thermostat to the cloud. The registered smart phone may change parameters of the thermostat.

An approach for device commissioning with a bluetooth may incorporate pairing a smart phone with a thermostat having bluetooth capability, doing a handshake with the thermostat to confirm pairing and communication, querying an app on the smart phone for an ISU, confirming the ISU, querying and transferring an address number from the thermostat to the cloud or smart phone, and registering the thermostat at a cloud with the app of the smart phone.

The thermostat may continuously broadcast an advertisement which is information to the smart phone. The paired smart phone may control, connect, change a state, get confirmation and disconnect. The thermostat may be open for control by any paired smart phone in a vicinity of the thermostat.

A bluetooth connection of the smart hone thermostat may be continuous. The connection of the smart phone may be on a priority list. When the smart phone leaves a vicinity of the thermostat, the smart phone may lose connection and a second smart phone next on the prioritized list may connect to the smart phone and thus control the thermostat. The thermostat may also broadcast an advertisement to enable one or more additional smart phones in the vicinity of a thermostat to join the smart phone still connected, in a connection to the thermostat, and also control the thermostat.

The thermostat may collect information about a state and history of the thermostat. The smart phone may download the information about the state and history of the thermostat via Bluetooth. The information may be used for diagnostics, analytics or troubleshooting.

If the smart phone is acting as a gateway, the second smart phone may connect to the thermostat through the cloud.

Acting as a gateway may be embedded in an app of the smart phone. The smart phone acting as a gateway may convey status and control messages from the cloud to the thermostat.

A communication layout may incorporate a thermostat having bluetooth communication capability, a first smart phone that operates as a gateway between the thermostat and the cloud, and a second smart phone that receives and sends messages to the cloud that receives and sends the messages from the second smart phone to the thermostat via the first smart phone.

The first smart phone may route messages from the thermostat to the cloud.

The first smart phone may cache messages from the thermostat to the cloud.

A user of the second smart phone may be remote from a facility where the thermostat is situated.

Any publication or patent document noted herein is hereby incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A thermostat system comprising:
a thermostat having bluetooth capability;
a hub having a direct bluetooth connection with the thermostat without the direct bluetooth connection going through any home area network, and having WiFi capability;
a router having a WiFi connection with the hub and having a connection with a cloud for transactions on cloud computing; and
a smart phone or tablet having a WiFi connection with the cloud; and
wherein:
the smart phone or tablet configured to transmit and receive signals to and from the thermostat;
the hub provides gateways to the cloud for remote access and data warehousing;
the hub further provides gateways to one or more additional bluetooth devices;
the one or more additional bluetooth devices are connected to a first home area network, and wherein the hub provides gateways to the one or more additional bluetooth devices through the first home area network; and
one or more WiFi devices are connected to a second home area network, and wherein the hub provides gateways to the one or more WiFi devices through the second home area network.

2. The system of claim 1, wherein the smart phone and the thermostat within a certain proximity of each other are capable of having peer to peer communication over bluetooth.

3. The system of claim 1, further comprising:
one or more additional hubs; and
wherein each of the one or more additional hubs has bluetooth connection to the thermostat.

4. The system of claim 3, further comprising one or more devices having bluetooth connection to each of the one or more additional hubs.

5. The system of claim 3, further comprising one or more devices having a WiFi connection to each of the one or more additional hubs.

6. The system of claim 1, wherein:
the hub provides a continuous connection of the thermostat to the cloud.

7. The system of claim 1, wherein:
one or more additional smartphones configured to be connected to the thermostat via the cloud, the router and the hub; and
the one or more additional smart phones are registered with the thermostat via a pairing procedure.

8. The system of claim 1, wherein:
a registered smartphone configured to update data about the thermostat to the cloud; and
the registered smart phone configured to change parameters of the thermostat.

9. A thermostat system comprising:
a thermostat having bluetooth capability;
a hub having a direct bluetooth connection with the thermostat without the direct bluetooth connection going through any home area network, and having WiFi capability;
a router having a WiFi connection with the hub and having a connection with a cloud for transactions on cloud computing; and
a smart phone or tablet having a WiFi connection with the cloud; and
wherein:
   the smart phone or tablet configured to transmit and receive signals to and from the thermostat;
   one or more additional smartphones configured to be connected to the thermostat via a direct connection from a first smart phone of the one or more additional smartphones to the cloud and from the cloud to the thermostat, via a direct connection from a second smart phone of the one or more additional smartphones to the router and from the router to the thermostat, or via a direct connection from a third smart phone of the one or more additional smartphones to the hub and from the hub to the thermostat;
   the hub is configured to provide gateways to one or more WiFi devices and one or more bluetooth devices; and
   the one or more additional smart phones are registered with the thermostat via a pairing procedure.

10. A thermostat system comprising:
a thermostat having bluetooth capability;
a hub having a direct bluetooth connection with the thermostat without the direct bluetooth connection going through any home area network, and having WiFi capability;
a router having a WiFi connection with the hub and having a connection with a cloud for transactions on cloud computing; and
a smart phone or tablet having a WiFi connection with the cloud; and
wherein:
   the smart phone or tablet configured to transmit and receive signals to and from the thermostat;
   a registered smartphone configured to update data about the thermostat to the cloud;
   the registered smart phone configured to change parameters of the thermostat;
   the hub provides gateways to one or more additional bluetooth devices and one or more WiFi devices; and
   the one or more additional bluetooth devices are connected to a first home area network, and wherein the hub provides gateways to the one or more additional bluetooth devices through the first home area network.

* * * * *